United States Patent
Khayat

(10) Patent No.: US 10,308,293 B2
(45) Date of Patent: Jun. 4, 2019

(54) MOTOR VEHICLE SPOILER HAVING A REMOVABLE LOWER FACE

(71) Applicant: Compagnie Plastic Omnium, Lyons (FR)

(72) Inventor: Issam Khayat, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 39 days.

(21) Appl. No.: 15/531,174

(22) PCT Filed: Nov. 18, 2015

(86) PCT No.: PCT/FR2015/053109
§ 371 (c)(1),
(2) Date: May 26, 2017

(87) PCT Pub. No.: WO2016/083705
PCT Pub. Date: Jun. 2, 2016

(65) Prior Publication Data
US 2018/0037277 A1  Feb. 8, 2018

(30) Foreign Application Priority Data

Nov. 28, 2014  (FR) ...................................... 14 61645

(51) Int. Cl.
*B62D 35/00*  (2006.01)
(52) U.S. Cl.
CPC ............. *B62D 35/007* (2013.01); *Y02T 10/82* (2013.01)
(58) Field of Classification Search
CPC .................................................. B62D 35/007
See application file for complete search history.

(56) References Cited

U.S. PATENT DOCUMENTS

2010/0026045 A1  2/2010  Thomas

FOREIGN PATENT DOCUMENTS

| CN | 202320523 U | 7/2012 | |
|---|---|---|---|
| DE | 102004030571 A1 | 1/2006 | |
| DE | 102012102442 A | 9/2013 | |
| WO | WO-2013/080003 A1 | 6/2013 | |
| WO | WO-2013099809 A1 * | 7/2013 | ........... B62D 35/007 |

OTHER PUBLICATIONS

International Search Report PCT/ISA/210 for International Application No. PCT/FR2015/053109 dated Feb. 9, 2016.
Written Opinion of the International Searching Authority PCT/ISA/237 for International Application No. PCT/FR2015/053109 dated Feb. 9, 2016.
Chinese Office Action dated Jul. 27, 2018 for corresponding Chinese Application No. 201580064082.9.

* cited by examiner

*Primary Examiner* — Lori L Lyjak
(74) *Attorney, Agent, or Firm* — Harness, Dickey & Pierce, P.L.C.

(57) ABSTRACT

The invention relates to a rear spoiler (1) of a motor vehicle, comprising a first part (10) which is intended to be fastened in a position assembled on the rear of the vehicle, and which forms the upper face of the spoiler (1), and a second part (20), which forms at least one part of the lower face of the spoiler (1), and which is adapted to cover an upper edge (985) of a rear window (98) of the vehicle when this second part (20) is in the assembled position, the second part (20) being removable.

13 Claims, 2 Drawing Sheets

MOTOR VEHICLE SPOILER HAVING A REMOVABLE LOWER FACE

CROSS-REFERENCE TO RELATED APPLICATIONS

This application is the U.S. National Phase application of PCT Application No. PCT/FR2015/053109 filed on Nov. 18, 2015, which claims priority to French Application No. 1461645 filed on Nov. 28, 2014, the contents of each of which are incorporated herein by reference in their entirety.

FIELD OF THE INVENTION

This invention relates to the field of motor vehicles.

It concerns more particularly a rear spoiler of a motor vehicle.

BACKGROUND OF THE INVENTION

A spoiler is a bodywork part designed to improve the aerodynamics of the vehicle to which this part is fastened. Spoilers are also used for aesthetic aspects of the vehicle. The rear spoiler is fastened to the rear of the vehicle. It is therefore a bodywork part located between the roof and the rear window.

The spoiler can be fastened, for example, to the upper part of the tailgate, at the back of the vehicle just above the upper edge of the rear window.

The rear window is assembled on the tailgate (or the roof) by a bonding operation which both fastens the rear window and provides a seal. To preserve the integrity of the adhesive seal, generally deposited as a continuous bead, the rear window must be approached and positioned and the adhesive pressed by an incident path almost perpendicular to the bonding track: in view of this assembly constraint, the approach path used to bring the rear window into position must not interfere with the spoiler. The spoiler must therefore be removed before positioning the rear window. However, this is undesirable since it involves an additional assembly and disassembly operation, and this is even impossible when the spoiler is integrated with the tailgate (the term "integrated with" means that the spoiler is molded with this part during manufacture) or undetachably fastened to the tailgate (or the roof or the body).

Alternatively, a spoiler which is short enough to allow the rear window to be positioned as described above can be used. However, this has the disadvantage of limiting the possible geometries of the spoiler. An additional disadvantage of such spoilers is that the upper edge of the rear window remains visible, which is detrimental in terms of appearance and therefore the quality perceived by a potential user.

OBJECT AND SUMMARY OF THE INVENTION

This invention aims to overcome these disadvantages.

This invention aims to propose a spoiler which allows the rear window to be assembled on the tailgate (or the roof) but whose length and geometry are not limited by this assembly operation.

This object is achieved by the fact that the spoiler comprises

A first part which is intended to be fastened in a position assembled on the rear of the vehicle, and which forms the upper face of the spoiler, A second part which forms at least one part of the lower face of the spoiler and which is adapted to cover the upper edge of the rear window of the vehicle when this second part is in the assembled position, this second part being removable so as to allow a rear window to be assembled on or disassembled from the vehicle.

Thanks to these arrangements, the rear window can be assembled on the rear of the vehicle in the continuity of the roof, either on the tailgate or on the roof or the body regardless of the geometry and length of the spoiler. To do this, the second removable part simply has to be removed and then put back once the rear window has been assembled. Furthermore, this second part, when in the position assembled on the first part, covers the upper edge of the rear window (and the rear window adhesive seal), which improves the quality perceived by a potential user.

According to the invention, the first part may form the trailing edge of said spoiler. This first part can be permanently fastened to a rear part of the vehicle.

According to an embodiment, the second part is adapted to be removably fastened in the assembled position to the first part using first fastening means.

According to an embodiment, the second part is adapted to be removably fastened in the assembled position to the rear part using second fastening means.

According to another embodiment, the second part carries technical equipment.

The invention also relates to an assembly comprising a rear part of a vehicle, and a spoiler according to the invention which is fastened to this rear part.

For example, the rear part has an upper extension which extends into the space between the first part and the second part. Thus, the distal end of the upper extension can be adapted to be shortened or lengthened in order to decrease or increase the length of said spoiler. Furthermore, the first part can be adapted to be fastened to the upper extension using first fastening means.

According to another example, the rear part has a lower extension which is located under the upper extension and to which the upper edge of the rear window is fastened. The second part can then be adapted to be fastened to the lower extension using second fastening means.

According to an example, this rear part is a tailgate which comprises a lining integrated with this tailgate, this lining having this upper extension and/or this lower extension.

Thus, the final length of the spoiler can be readily selected and its geometry configured simply by modifying the length of the upper extension of the tailgate lining. A first part of the spoiler, whose length is adapted to that of the tailgate, and a second part of the spoiler are then positioned on the tailgate lining.

BRIEF DESCRIPTION OF THE DRAWINGS

The invention will be clearly understood and its advantages will appear on reading the detailed description below, of an embodiment represented as a non-limiting example. The description refers to the attached drawings, on which.

MORE DETAILED DESCRIPTION

Figure 1:
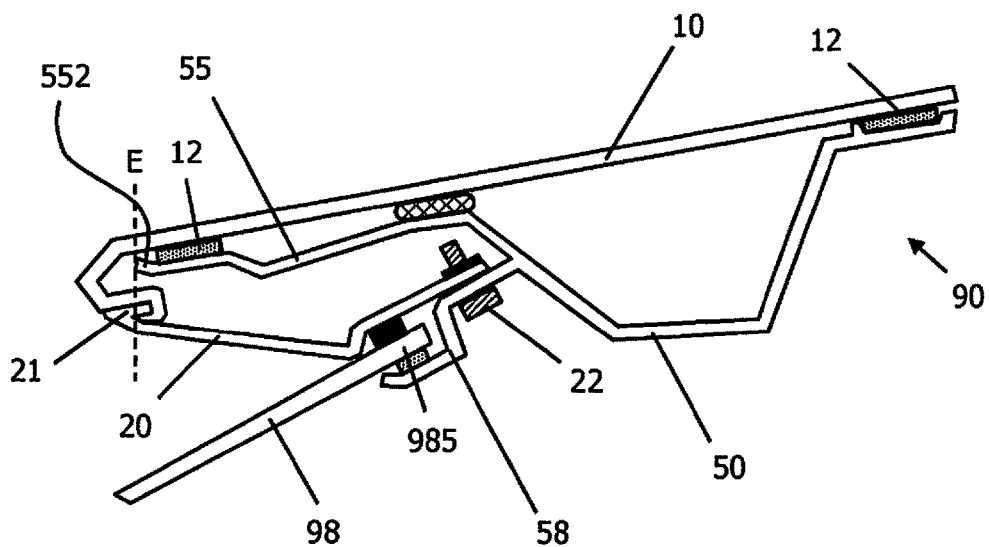
FIG. 1 is a cross-sectional view of a spoiler and of an assembly according to the invention.

FIG. 1 shows a particular embodiment of a rear spoiler 1 according to the invention.

The invention is described below in the case where the first part 10 of the spoiler 1 is mounted on the tailgate 90 of the vehicle. The invention also applies, however, in the case where the spoiler 1 is mounted on a vehicle which does not have a tailgate 90, the spoiler 1 then being mounted on the roof of the vehicle, or on the body of the vehicle. For example, the spoiler 1 is mounted on a roof rear cross-member.

In the more general case, the spoiler 1 is mounted on a rear part of a vehicle.

Thus, in the description below, the rear part is a tailgate which comprises a lining 50 integrated with this tailgate, this lining 50 having an upper extension 55 and/or a lower extension 58 (see below).

The spoiler 1 shown on FIG. 1 is mounted on a lining 50 of a tailgate 90 of a motor vehicle, more precisely on the upper upright of the frame forming the opening element intended to receive the rear window 98.

The lining 50 is integrated with the tailgate 90, in other words the lining 50 is molded with the tailgate 90 during its manufacture.

By convention, the lining 50 (and its upper 55 and lower 58 extensions—see below) are not part of the spoiler 1.

The cross-section of FIG. 1 is in the longitudinal plane of the vehicle (from front to rear, the front being located on the right of the figure, and the rear on the left), the direction perpendicular to the cross-sectional plane is therefore the left-right direction of the vehicle (transverse direction).

This spoiler 1 comprises a first part 10 which is fastened to this lining 50 in a position assembled using adhesive 12 as shown on FIG. 1. Alternatively, the first part 10 is fastened to the lining 50 using permanent mechanical assembly means such as rivets or removable mechanical assembly means such as bolt-nut assemblies, or a mixture of several of these assembly means.

Alternatively, at least one portion of the first part 10 is integrated with the tailgate 90. The entire first part 10 can therefore be integrated with the tailgate 90.

Thus, for example, according to the invention, the first part 10 is fastened permanently to the tailgate 50, or more generally to a rear part of the vehicle.

The first part 10 forms the upper face of the spoiler 1.

For example, as shown on FIG. 1, the first part 10 also forms the trailing edge of the spoiler 1.

The spoiler 1 also comprises a second part 20 which forms at least a part of the lower face of the spoiler 1. For example, as shown on FIG. 1, the second part 20 forms the entire lower face of the spoiler 1.

The tailgate 90 carries a (rear) window 98, which is fastened in particular by its upper edge 985 to this tailgate 90 by an adhesive seal (visible on FIG. 1).

The second part 20 is removable to allow assembly or disassembly of this rear window 98 on/from the vehicle. Thus, once the rear window 98 is fastened to the tailgate 90, the second part 20 can be fastened to the first part 10 and/or to the tailgate 90, the second part 20 then being in an assembled position.

In this assembled position, the second part 20 covers the upper edge 985 of the rear window 98, such that this edge (and in particular the bead of adhesive or adhesive seal with the lining 50 of the tailgate 90) is not visible to a person standing at the rear and outside of the vehicle facing the rear window and the spoiler.

Generally, the second part (20) is adapted to be removably fastened in the assembled position to the first part (10) using first fastening means (21). Alternatively, or additionally, the second part (20) is adapted to be removably fastened in the assembled position to the tailgate (90) (or more generally to the rear part of the vehicle) using second fastening means (22).

For example, the second part 20 is removably fastened to the first part 10 using first fastening means 21, and to the tailgate 90 using second fastening means 22.

FIG. 1 shows the case where the second part 20 is fastened to both the first part 10 and the lining 50 of the tailgate 90.

The first fastening means 21 are the assembly composed firstly by a groove formed by the curved end of the first part 10 extending over all or some of the transverse width of the first part 10, and secondly by a hook at one end of the second part 20 extending over all or some of the transverse width of the second part 20, this groove and this hook cooperating to fasten the first part 10 to the second part 20.

Alternatively, the first fastening means 21 are, for example, clips, tab/hole assemblies.

As shown on FIG. 1, the lining 50 has an upper extension 55, and a lower extension 58 located under the upper extension 55 and to which the upper edge 985 of the rear window 98 is fastened. In this case, the lining 50 is subdivided from front to rear (vehicle direction) into the upper extension 55 and lower extension 58.

Advantageously, the upper extension 55 extends into the space between the first part 10 and the second part 20.

Other geometries of the upper extension 55 are possible.

The first part 10 is adapted to be fastened to the upper extension 55 using the first fastening means 21 and the second part 20 is adapted to be fastened to the lower extension 58 using the second fastening means 22.

FIG. 1 shows the first part 10 in the position assembled on the upper extension 55 (for example using adhesive) and the second part 20 in the position assembled on the lower extension 58 using the second fastening means 22.

The second fastening means 22 are bolt-nut assemblies distributed over the transverse width of the lining 50 of the tailgate 90 and which fasten the second part 20 to the lining 50.

Thus, the second part 20, being fastened at one end to the first part 10 and at its other end to the tailgate 90, is held firmly in position.

Alternatively, the second fastening means 22 are, for example, clips, tab/hole assemblies.

Since the second part 20 is removable, the rear window 98 can still be removed after removing the second part 20 and replaced by another rear window if necessary, without the need to touch the first part 10, which is not necessarily removable. After replacing the rear window 98, the second part 20 is simply fastened again to the first part 10.

In the assembled position, the upper edge 985 of the rear window 98 is thus sandwiched between one end of the lining 50 to which this upper edge 985 is bonded, and a portion of the second part 20, as shown on FIG. 1.

Advantageously, an elastic seal is inserted between the upper edge 985 and this portion of the second part 20, in order to compensate for the clearances and provide a seal.

Figure 2:
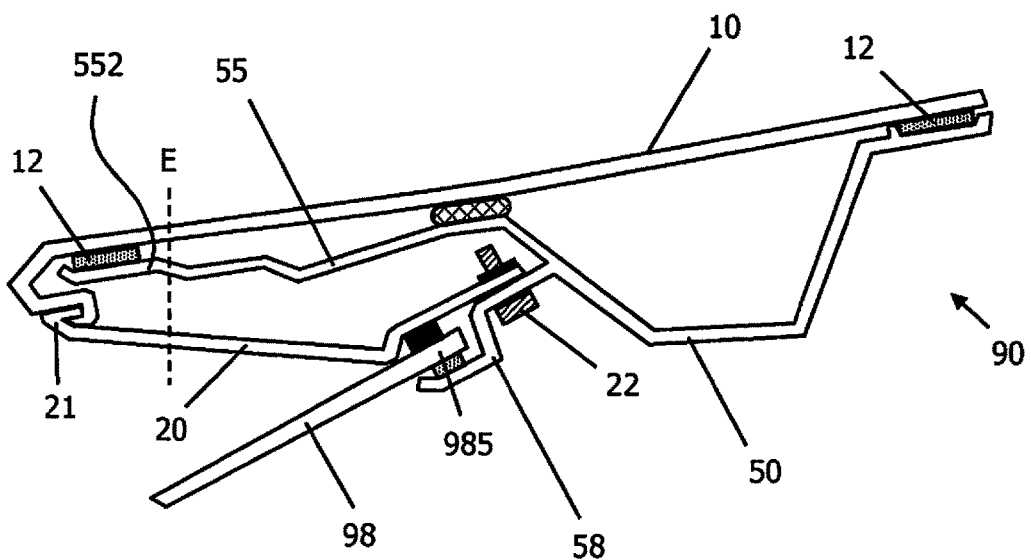
FIG. 2 is a cross-sectional view of a variant of a spoiler and of an assembly according to the invention.

FIG. 2 shows a variant of the invention wherein the upper extension 55 of the lining 50 extends more rearwardly than the upper extension 55 in the case which is shown on FIG. 1.

The vertical dotted line designated "E" on FIG. 1 marks the rear end of the upper extension 55 (distal end 552). On FIG. 2, the line "E" is positioned identically relative to the shape and position elements identical between the two figures (for example the rear window 98). Note that the upper extension 55 has a distal end 552 which extends rearwardly beyond the line "E". Consequently, the first part 10 and the second part 20 of the spoiler 1 also extend more rearwardly than in the case which is shown on FIG. 1. In both cases, the first part 10 rests on (and is for example bonded to) the distal end 552, thereby making the spoiler 1 more rigid.

A spoiler 1 extending more rearwardly can therefore be obtained, which may in particular improve the vehicle aerodynamics.

Conversely, the distal end 552 of the upper extension 55 can be shortened to reduce the length of the spoiler 1, which amounts to changing from the variant shown on FIG. 2 to the variant shown on FIG. 1.

Thus, the distal end 552 of the upper extension 55 is adapted to be shortened or lengthened in order to decrease or increase the length of the spoiler 1.

This offers the advantage of allowing the properties of the spoiler 1 and its external appearance to be easily modified.

Figure 3:
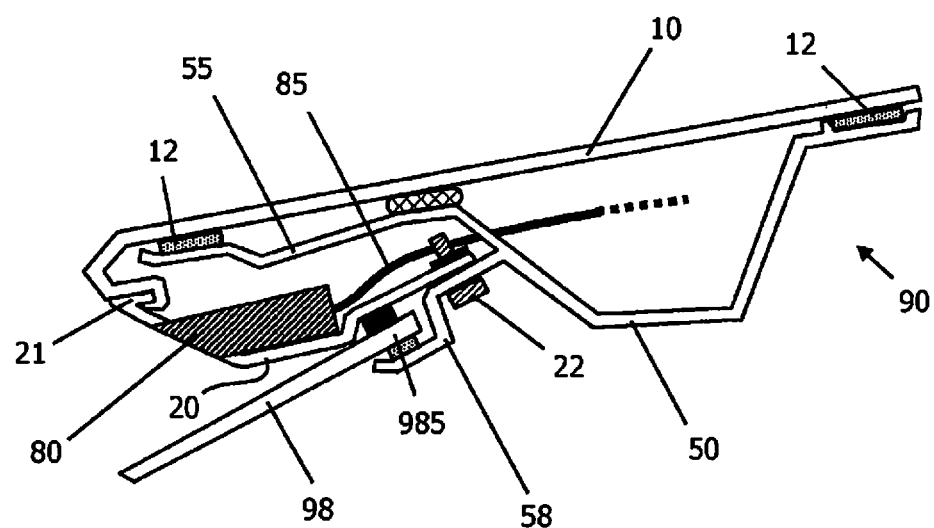
FIG. 3 is a cross-sectional view of a spoiler and of an assembly according to another variant of the invention.

FIG. 3 shows a variant of the invention wherein the second part 20 carries technical equipment 80.

A technical element means an element providing a functionality to the vehicle other than that of the spoiler. This technical part is for example all or part of a rear signal light, a decorative (chrome strip, emblem, etc.) or light (backlit strip, etc.) element, an antenna, a windscreen washer (element composed of the nozzle and the pipe), a wiper, a camera, a sensor, a radar. The technical element 80 opens to the outside of the vehicle through a hole created especially in the second part 20.

Advantageously, this hole can be arranged to accommodate one of several different technical elements 80, so that the technical elements 80 can be interchanged without having to change the second part 20.

Where applicable, this technical element is connected to an electricity or water supply of the vehicle by a connection 85, which if necessary crosses the lining 50 through a hole created especially for this connection.

Thus, the technical element 80 is more visible from another vehicle following the vehicle, which is especially advantageous if it is a signaling light or a decorative and/or light element.

Advantageously, the second part 20 may also simultaneously carry a plurality of technical elements 80, for example a rear light and a wiper.

What is claimed is:

1. A rear spoiler of a motor vehicle, the rear spoiler comprising:
a first part fastened in an assembled position on a rear part of said motor vehicle, and forming an upper face of said rear spoiler; and
a second part forming at least one part of a lower face of said rear spoiler and covering an upper edge of a rear window of said motor vehicle when in the assembled position, said second part being removable so as to allow the rear window to be assembled on or disassembled from said motor vehicle.

2. The rear spoiler according to claim 1, wherein said first part forms a trailing edge of said rear spoiler.

3. The rear spoiler according to claim 1, wherein said first part is fastened permanently to the rear part of said motor vehicle.

4. The rear spoiler according to claim 1, wherein said second part is adapted to be removably fastened in the assembled position to said first part by first fastening means.

5. The rear spoiler according to claim 1, wherein said second part is adapted to be removably fastened in the assembled position to said rear part by second fastening means.

6. The rear spoiler according to claim 1, wherein said second part carries technical equipment.

7. An assembly comprising:
a rear part of a vehicle, and
a spoiler according to claim 1, the spoiler being fastened to said rear part.

8. The assembly according to claim 7, wherein said rear part of the vehicle has an upper extension which extends into a space between said first part and said second part.

9. The assembly according to claim 8, wherein a distal end of said upper extension is adapted to be shortened or lengthened in order to decrease or increase a length of said spoiler.

10. The assembly according to claim 8, wherein said first part is adapted to be fastened to said upper extension by first fastening means.

11. The assembly according to claim 8, wherein said rear part has a lower extension under said upper extension and to which said upper edge of the rear window is fastened.

12. The assembly according to claim 11, wherein said second part is adapted to be fastened to said lower extension using second fastening means.

13. The assembly according to claim 11, wherein the rear part is a tailgate comprising a lining integrated with the tailgate, the lining having at least one of said upper extension and lower extension.

* * * * *

UNITED STATES PATENT AND TRADEMARK OFFICE
CERTIFICATE OF CORRECTION

PATENT NO. : 10,308,293 B2  
APPLICATION NO. : 15/531174  
DATED : June 4, 2019  
INVENTOR(S) : Issam Khayat Page 1 of 1

It is certified that error appears in the above-identified patent and that said Letters Patent is hereby corrected as shown below:

(71) Applicant should read: Compagnie Plastic Omnium, Lyon (FR)

(72) Inventor should read: Issam Khayat, Lyon (FR)

(73) Assignee should read: Compagnie Plastic Omnium, Lyon (FR)

Signed and Sealed this  
First Day of June, 2021

Drew Hirshfeld  
*Performing the Functions and Duties of the  
Under Secretary of Commerce for Intellectual Property and  
Director of the United States Patent and Trademark Office*